Figure 6:
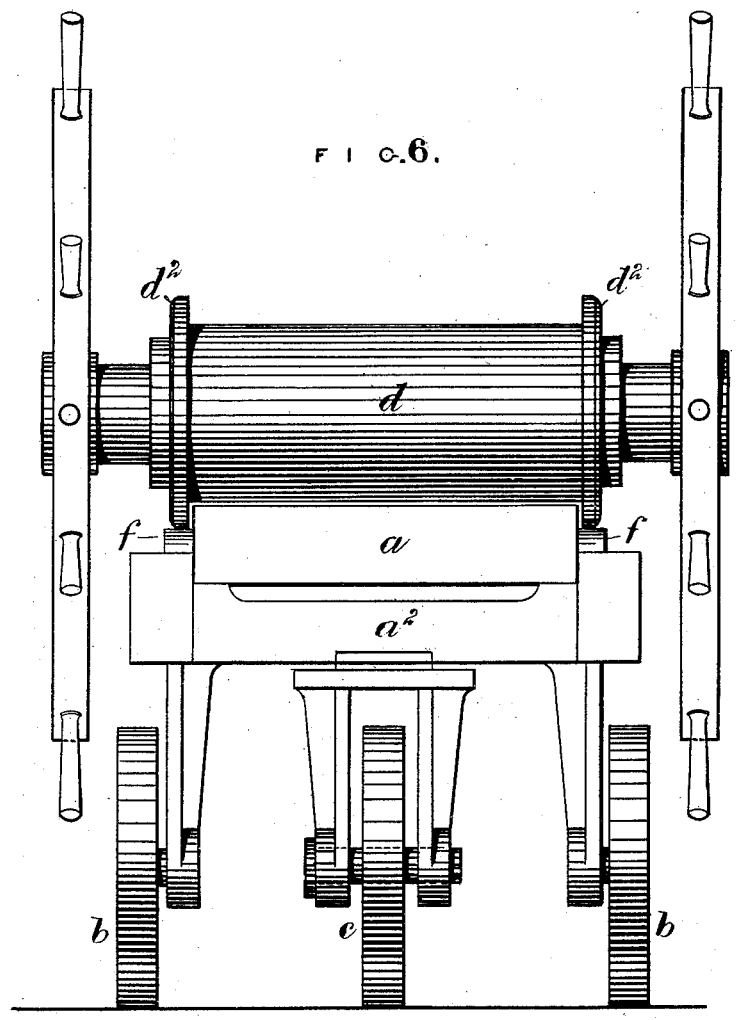

(No Model.)　　　　　　　　　　　　　　　　5 Sheets—Sheet 1.
W. E. CHANCE.
MACHINERY FOR THE MANUFACTURE OF SHEETS OF RIPPLED GLASS.
No. 359,128.　　　　　　　　　　　Patented Mar. 8, 1887.
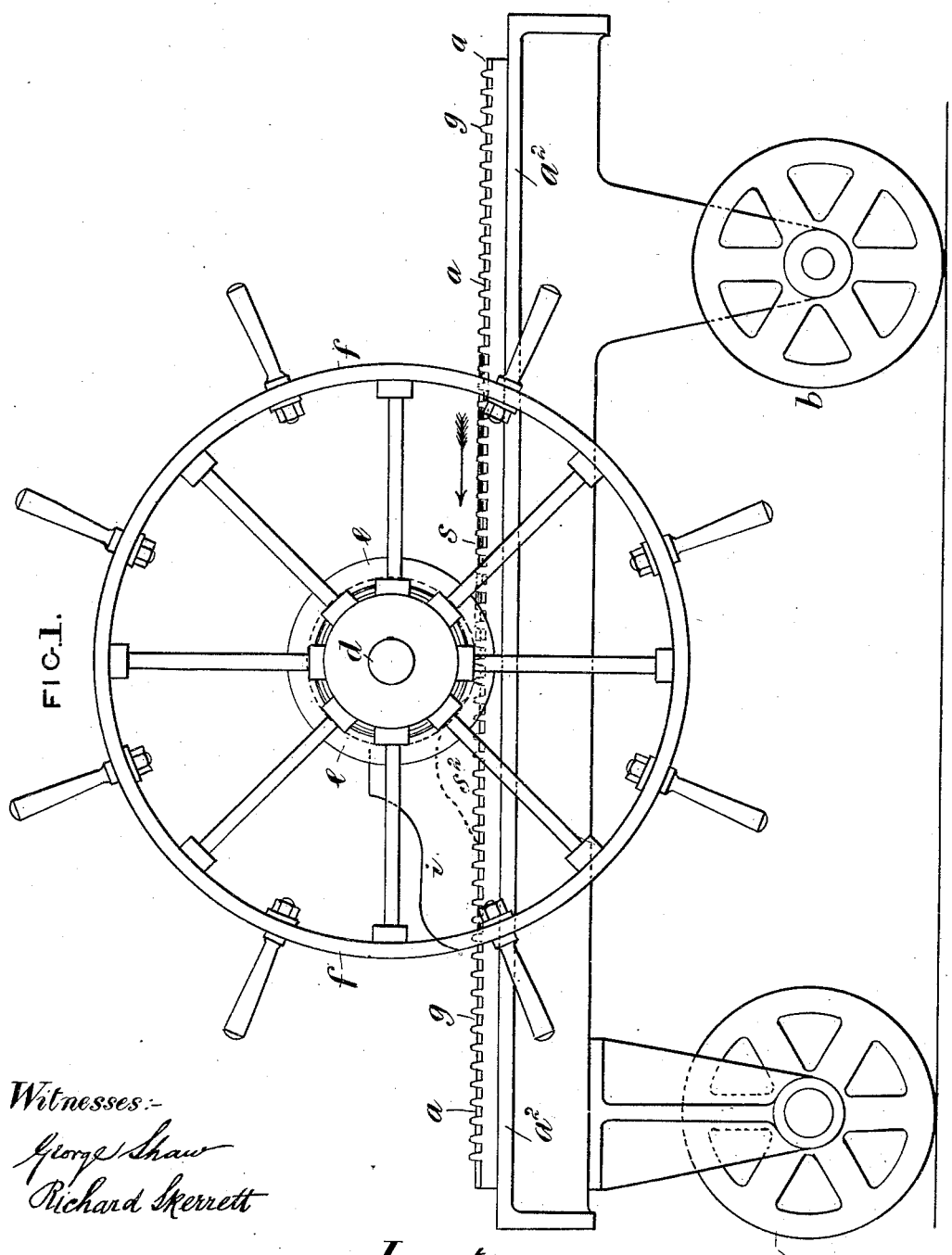
Witnesses:—
George Shaw
Richard Skerrett
Inventor:—
William Edward Chance.

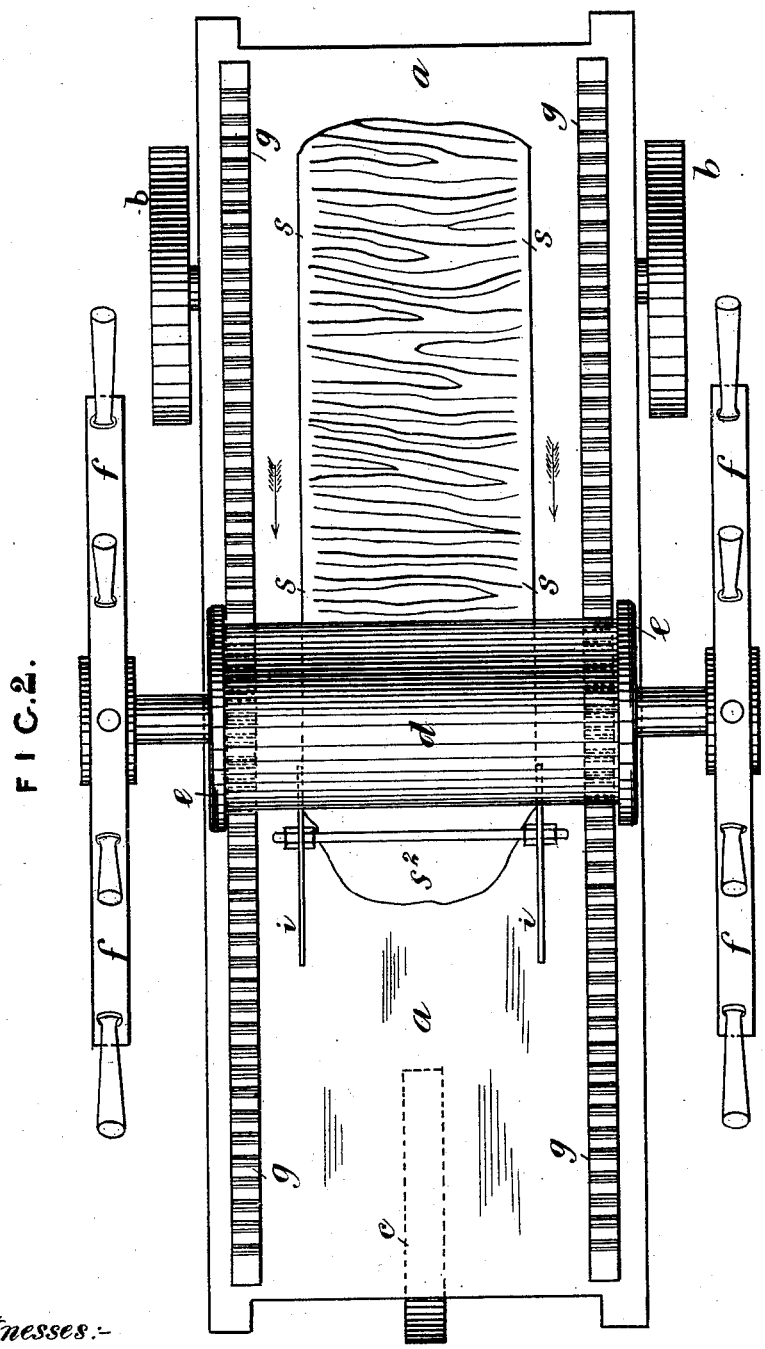

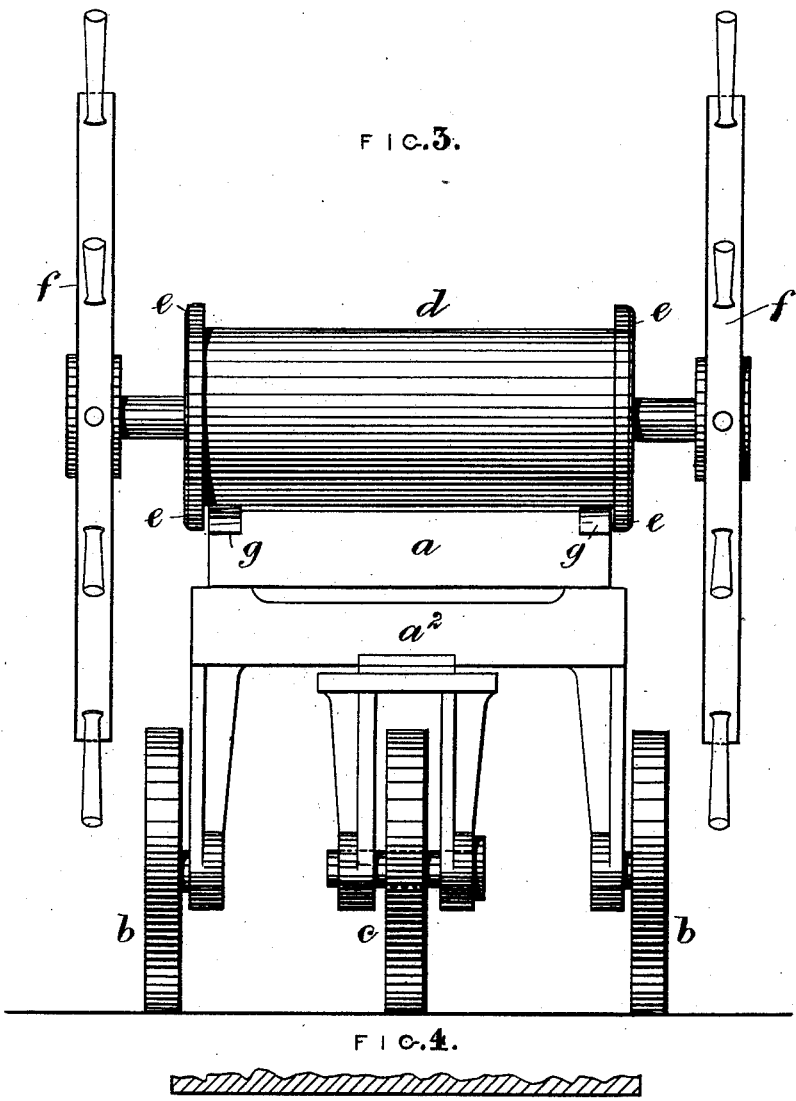

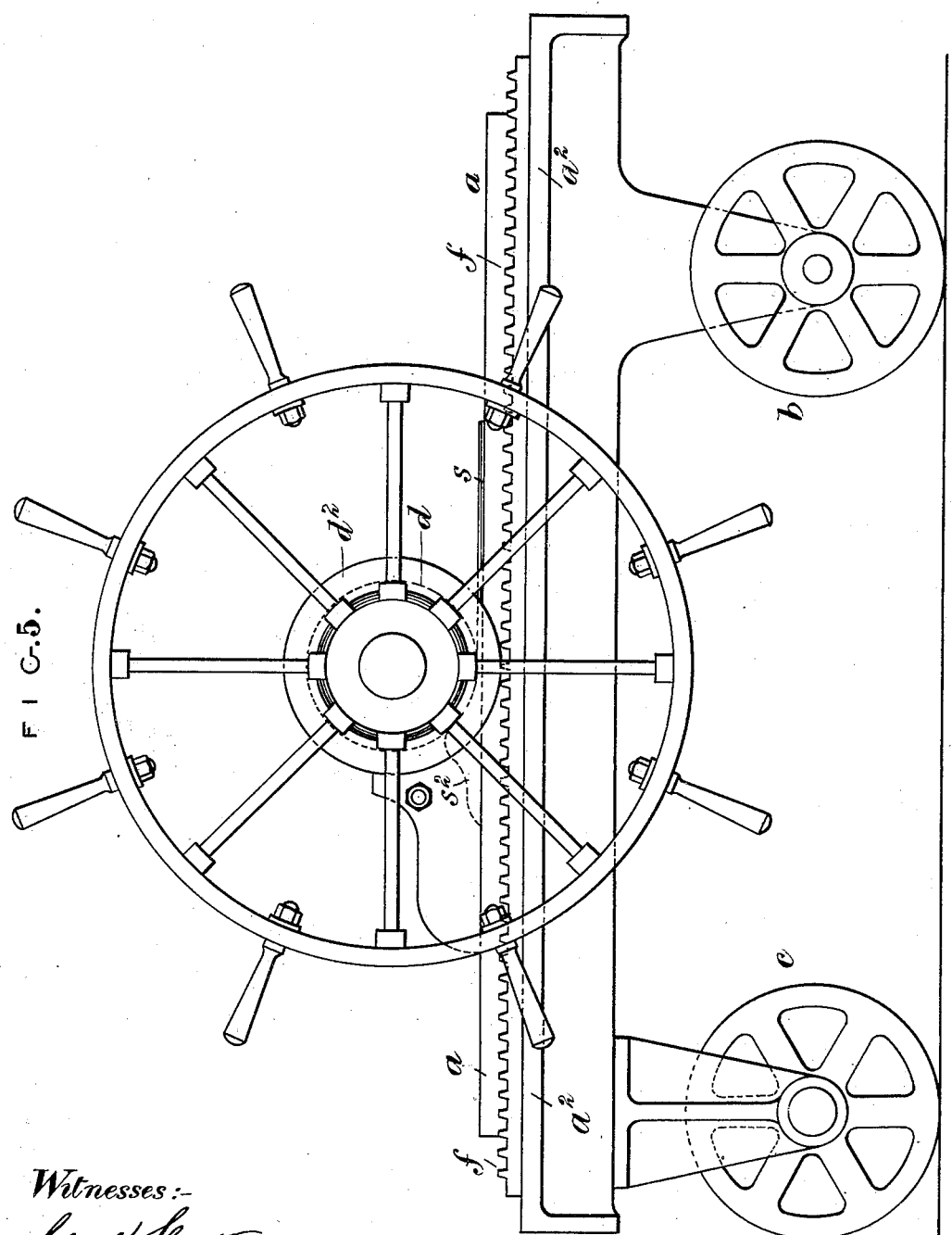

(No Model.) 5 Sheets—Sheet 5.

W. E. CHANCE.
MACHINERY FOR THE MANUFACTURE OF SHEETS OF RIPPLED GLASS.

No. 359,128. Patented Mar. 8, 1887.

Witnesses:—
George Shaw
Richard Skerrett

Inventor:—
William Edward Chance

United States Patent Office.

WILLIAM EDWARD CHANCE, OF OLDBURY, COUNTY OF WORCESTER, ENGLAND.

MACHINERY FOR THE MANUFACTURE OF SHEETS OF RIPPLED GLASS.

SPECIFICATION forming part of Letters Patent No. 359,128, dated March 8, 1887.

Application filed January 8, 1887. Serial No. 223,774. (No model.) Patented in England March 20, 1886, No. 3,972.

*To all whom it may concern:*

Be it known that I, WILLIAM EDWARD CHANCE, of Oldbury, in the county of Worcester, England, a subject of the Queen of Great Britain, have invented new or Improved Machinery for the Manufacture of Sheets of Rippled Glass, (for which I have made application for Letters Patent in Great Britain, No. 3,972, dated March 20, 1886,) of which the following is a specification.

My invention consists of improvements in or modifications of the machinery ordinarily employed in the manufacture of sheets of rolled plate-glass, the object of my invention being to give to one side of the sheet of glass produced a brilliant rippled or irregularly-corrugated surface. The machinery ordinarily employed to manufacture sheets of rolled plate-glass consists, essentially, of a horizontal iron table, with its upper surface plain, lined, or figured, and a plain cylindrical roller supported at or near its ends by and traveling on metallic supports of uniform thickness parallel to the surface of the table. The said supports determine the thickness of the sheets of glass made. The said table and roller are provided with minor appliances, which I do not consider it necessary to describe. Molten glass poured on the table is rolled by the action of the roller into a sheet smooth and plain on its upper side, and of uniform thickness. In this, the ordinary machinery, the axis of the rotating and advancing roller travels in a plane parallel to the surface of the table.

In constructing according to my invention machinery for the manufacture of rippled glass I employ the ordinary table and roller; but, instead of causing the axis of the rotating and advancing roller to travel in a plane parallel to the surface of the table, I make the said axis travel in an undulating path—that is, while the said axis is maintained parallel to the surface of the table, it alternately rises and falls as it advances. This I effect by supporting the plain roller at or near its ends, or the flanges, if flanges be used, on supports having an undulating or toothed figure or figures, and causing the plain roller or its flanges to travel on the said undulating supports.

Glass rolled by my new or improved machinery has a brilliant irregular corrugated or rippled figure on that surface operated upon by the roller. I do not limit myself to the number, size, shape, or distances apart of the teeth or undulations on the parts by which the undulating motion of the roller is produced, as these may be varied without departing from the nature of my invention. For example, teeth or other projections may be employed and the depth and breadth and distances apart of the undulations or projections may be varied, according to the depth and breadth and distances apart of the ripples it is desired to produce. By varying the relative sizes and weight of the roller, and the teeth, projections, or undulations, ripples of various sizes and figures may be produced.

I will now proceed to describe, with reference to the accompanying drawings, the manner in which my invention is to be performed.

Figure 1 represents in side elevation, Fig. 2 in plan, and Fig. 3 in end elevation, machinery constructed according to my invention for the manufacture of sheets of rippled glass. In the machine, Figs. 1, 2, and 3, the roller is supported at its ends on supports having an undulating or toothed figure. Fig. 4 represents in longitudinal section a portion of a sheet of rippled glass made by the said machinery. In Figs. 1 and 2 the sheet of glass is marked $s$.

The same letters of reference indicate the same parts in Figs. 1, 2, and 3. $a$ is the horizontal iron table supported on the bed $a^2$, the said bed being supported upon the wheels $b$ $b$ and $c$, by which wheels the machine may be readily transported from place to place. $d$ is the hand-worked cylindrical roller provided with flanges $e$ $e$ (working against the sides of the table $a$) and hand-wheels $f f$. $g g$ are toothed racks let into the table at or near its edges. The ends of the roller $d$ rest and travel upon the said racks $g g$. The racks $g g$ on which the roller travels and which communicate to it an undulating or jumping motion serve also to determine the thickness of the sheet of rippled glass produced. The flanges $e e$ serve to guide the roller $d$ in its course over the table $a$ and to prevent any motion of the roller $d$ in the line of its axis. I prefer to make the teeth of the racks $g g$ at such a distance apart that the rising-and-falling motion of the roller as it travels upon them is limited in small-sized sheets of the usual thickness to a range equal to about one-half the maximum thickness of the sheet of glass to be rolled. I do not, however, limit myself to any particular range in the up-and-down motion of the roller, either in this machine or in any of the machines made according to my invention. The said racks $g$ $g$ may be raised for the purpose of producing thicker sheets of rippled glass by the introduction of strips of iron or packing-pieces under them. Each of the said racks $g$ $g$ may be made in one piece or in several short lengths. I prefer the latter method of construction.

The racks $g$ $g$ may be fixed in their places by screwing or otherwise.

The racks of the machines hereinafter described may be made and packed or adjusted in the ways just described. In front of the roller $d$ and supported on the table $a$ are adjustable and removable metal guides $i$ $i$, between which guides the mass of molten glass $s^2$ to be rolled is confined, and by which the width of the sheet of rolled glass $s$ is determined. The outer edges or selvages of the sheet of glass, which in process of rolling are in contact with the inner side surfaces of the said metal guides $i$ $i$, are but very slightly rippled and are of nearly uniform thickness.

The machine is used in the following manner: The roller $d$ being at the right-hand end of the table $a$ and being supported by the toothed supports $g$ $g$ at the proper distance above the surface of the table $a$ to make a sheet of rippled glass of the required thickness, the molten glass $s^2$ is poured on the table $a$ between the metal guides $i$ $i$, and the roller $d$ is rotated by its hand-wheels $f f$ in the direction proper to make the said roller $d$ advance over the table $a$ in the direction of the arrows, Figs. 1 and 2. By the action of the roller $d$ the molten glass is rolled into a sheet of the width of the metal guides $i$ $i$, and of a thickness determined by the adjustment of the toothed racks $g$ $g$, that side of the sheet in contact with the table being smooth and plain where the table has no pattern on it; but the upper face of the sheet, or that face operated upon by the roller $d$, has an irregular corrugated or rippled figure, as represented in plan in Fig. 2 and in longitudinal section in the separate view, Fig. 4.

Fig. 5 represents in side elevation, and Fig. 6 in end elevation, machinery, made according to my invention, in which flanges at the ends of the roller travel on undulating or toothed supports and produce the required undulating or jumping motion.

The same letters indicate the same parts in Figs. 5 and 6. $a$ is the table; $a^2$, the bed on which the table $a$ is supported. $d^2 d^2$ are flanges on the ends of the roller $d$. The said flanges $d^2 d^2$ overhang and work against the edges of the table $a$. (See Fig. 6.) Besides guiding the roller $d$ in its traveling motion over the said table $a$, the said flanges $d^2 d^2$ also prevent lateral motion in the roller $d$, and impart to the said roller the motion necessary to produce the required rippled surface on the sheet of rolled glass. $f f$ are longitudinal parallel corrugated or toothed supports removable and adjustable on the bed $a^2$ of the table $a$. On the supports $f f$ the flanges $d^2 d^2$ of the roller $d$ bear and travel. (See Fig. 6.) As the roller $d$ is made to travel by means of its flanges $d^2 d^2$ over the table $a$, the said roller by the traveling motion of the flanges $d^2 d^2$ upon the supports $f f$ is made to rise and fall and to produce the requisite rippling. The thickness of the sheet of glass is determined by the height of the supports $f f$, which may be raised or lowered, as required.

I believe the action of the said machine, Figs. 5 and 6, will be readily understood by the description hereinbefore given of the action of the machine, Figs. 1, 2, and 3.

I have described and represented those forms of my invention which I believe to be of the greatest practical value. I wish it, however, to be understood that I do not limit myself to these forms, as they may in some cases be modified. For example, where small masses of molten glass are operated upon the flanges for guiding the roller may be dispensed with, the action of the workmen on the hand-wheels, combined with the weight of the roller, sufficing to preserve the parallelism of the motion of the roller. I prefer, however, to use the flanges referred to.

Having now particularly described and ascertained the nature of my invention and the manner in which the same is to be performed, I declare that I claim as my invention of new or improved machinery for the manufacture of sheets of rippled glass—

The combination, with the table, table-bed, and roller, (with or without flanges,) of machinery used for rolling sheets of glass, of the undulating or toothed supports for the roller or flanges of the roller to bear and travel upon, substantially as hereinbefore described, and illustrated in the accompanying drawings, whereby the said roller is made to undulate or rise and fall as it travels over the table on which the molten glass is being rolled, and thereby to give an irregular or rippled figure to that surface of the sheet of glass operated upon by the roller.

WILLIAM EDWARD CHANCE. [L. S.]

Witnesses:
GEORGE SHAW,
RICHARD SKERRETT.